United States Patent
Nakagawa et al.

(10) Patent No.: US 9,150,379 B2
(45) Date of Patent: Oct. 6, 2015

(54) WIRE TRAVELING DEVICE

(75) Inventors: Takayuki Nakagawa, Chiyoda-ku (JP);
Yuhei Domori, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 14/374,448

(22) PCT Filed: Jan. 30, 2012

(86) PCT No.: PCT/JP2012/052040
§ 371 (c)(1),
(2), (4) Date: Jul. 24, 2014

(87) PCT Pub. No.: WO2013/114547
PCT Pub. Date: Aug. 8, 2013

(65) Prior Publication Data
US 2015/0069166 A1    Mar. 12, 2015

(51) Int. Cl.
*B65H 59/38* (2006.01)
*B23H 7/20* (2006.01)
*B23H 7/10* (2006.01)

(52) U.S. Cl.
CPC ............ *B65H 59/38* (2013.01); *B23H 7/104* (2013.01); *B65H 59/388* (2013.01); *B65H 2701/36* (2013.01)

(58) Field of Classification Search
CPC .......... B23H 7/10; B23H 7/105; B23H 7/104; B65H 59/38; B65H 59/384; B65H 59/388; B65H 2701/36
See application file for complete search history.

(56) References Cited

U.S. PATENT DOCUMENTS 3,613,975 A * 10/1971 Knight ............................ 226/25
(Continued)

FOREIGN PATENT DOCUMENTS

| JP | 60-191724 A | 9/1985 |
| JP | 61-263570 A | 11/1986 |

(Continued)

OTHER PUBLICATIONS

International Search Report of PCT/JP2012/052040 dated Mar. 6, 2012.

*Primary Examiner* — Geoffrey S Evans
(74) *Attorney, Agent, or Firm* — Sughrue Mion, PLLC; Richard C. Turner

(57) ABSTRACT

A wire travelling device including a wire-feed-roller circumferential-speed calculation unit and a wire-collection roller circumferential-speed calculation unit that calculate each circumferential speed of the wire feed roller and the wire collection roller, a circumferential-speed-difference holding unit that calculates a difference between the circumferential speed of the wire feed roller and the circumferential speed of the wire collection roller as a circumferential speed difference and holds therein the calculated circumferential speed difference, and a wire-feed-roller speed control unit and a wire-collection roller speed control unit that control the wire feed roller and the wire collection roller, in changing a traveling speed of the wire, by a wire-feed-roller speed instruction value and a wire-collection roller speed instruction value generated so that the circumferential speed difference before changing the traveling speed of the wire is maintained after the changing.

10 Claims, 6 Drawing Sheets

(56) References Cited

U.S. PATENT DOCUMENTS

| | | | | |
|---|---|---|---|---|
| 4,298,781 A | * | 11/1981 | Inoue | 219/69.12 |
| 4,350,936 A | * | 9/1982 | Jackson | 318/7 |
| 4,495,038 A | * | 1/1985 | Inoue | 219/69.12 |
| 4,998,003 A | * | 3/1991 | Kawanabe | 219/69.12 |
| 2008/0217300 A1 | | 9/2008 | Kita et al. | |

FOREIGN PATENT DOCUMENTS

| | | |
|---|---|---|
| JP | 06-079537 A | 3/1994 |
| JP | 06-218628 A | 8/1994 |
| JP | 06-320343 A | 11/1994 |
| JP | 2005-022810 A | 1/2005 |
| JP | 2008-221343 A | 9/2008 |

* cited by examiner

WIRE TRAVELING DEVICE

CROSS REFERENCE TO RELATED APPLICATIONS

This is a National Stage of International Application No. PCT/JP2012/052040 filed Jan. 30, 2012, the contents of which are incorporated herein by reference in its entirety.

FIELD

The present invention relates to a wire traveling device of a wire electric discharge machine.

BACKGROUND

In a wire electric discharge machine, a stretched wire, which is laid in a tensioned state, between a wire feed roller and a wire collection roller is travel.

During wire traveling, the tension of the wire is higher and the amount of stretching thereof is larger near the wire collection roller than near the wire feed roller due to the friction force of a guide roller placed between the wire feed roller and the wire collection roller. Therefore, the circumferential speed of the wire collection roller is generally higher than that of the wire feed roller.

Conventionally, when an acceleration/deceleration process is performed according to rotational speed instructions for the rollers during wire traveling, the acceleration/deceleration process is performed by independent control systems having different control performances and thus a difference in the speeds of the rollers during the acceleration/deceleration process differs from that immediately before the acceleration/deceleration process is performed.

If the circumferential speed of the wire collection roller becomes higher than that of the wire feed roller and a difference in the circumferential speeds increases to exceed a certain value, the wire is broken. Contrary thereto, if the circumferential speed of the wire feed roller becomes higher than that of the wire collection roller, the wire sags.

Accordingly, in a wire traveling device of a conventional wire electric discharge machine, when automatic wire connection is performed using a fine wire at a high speed, wire breaking or wire sagging frequently occurs during wire acceleration/deceleration processes. Therefore, at the time of automatic connection of a fine wire, the wire feed speed needs to be lower.

Patent Literature 1 discloses a technique of detecting rotational speeds of respective rollers and keeping the tension of wires constant.

CITATION LIST

Patent Literature

Patent Literature 1: Japanese Patent Application Laid-open No. H06-218628

SUMMARY

Technical Problem

However, according to the conventional technique mentioned above, a difference in rotational speeds between a wire collection roller and a wire feed roller is previously calculated from a wire diameter or a wire material and a setting tension. Therefore, the setting value needs to be determined according to the wire diameter or the wire material and thus setting becomes complicated, or wire breaking or sagging occurs when the wire diameter or the wire material varies.

The present invention has been achieved in view of the above problems and an object of the present invention is to provide a wire traveling device that can prevent occurrence of wire breaking or slack when the traveling speed of a wire is changed.

Solution to Problem

The present invention is directed to a wire traveling device that achieve the object. The wire traveling device travels a stretched wire between a wire feed roller and a wire collection roller and includes a circumferential-speed calculation unit that calculates each circumferential speed of the wire feed roller and the wire collection roller based on feedback information from the wire feed roller and the wire collection roller; a circumferential-speed-difference holding unit that calculates a difference between the circumferential speed of the wire feed roller and the circumferential speed of the wire collection roller as a circumferential speed difference and holds therein the calculated circumferential speed difference; and a speed-instruction generation unit that, in changing a traveling speed of the wire, generates a speed instruction value for one of the wire feed roller and the wire collection roller so that the circumferential speed difference before the changing is maintained, and outputs each of the generated speed instruction values to the wire feed roller and the wire collection roller.

Advantageous Effects of Invention

The wire traveling device according to the present invention can keep the circumferential speed difference between the wire feed roller and the wire collection roller constant and prevent occurrence of wire breaking or slack when the traveling speed of a wire is changed.

DESCRIPTION OF EMBODIMENTS

Exemplary embodiments of a wire traveling device according to the present invention will be explained below in detail with reference to the accompanying drawings. The present invention is not limited to the embodiments.

Embodiment

Figure 1:
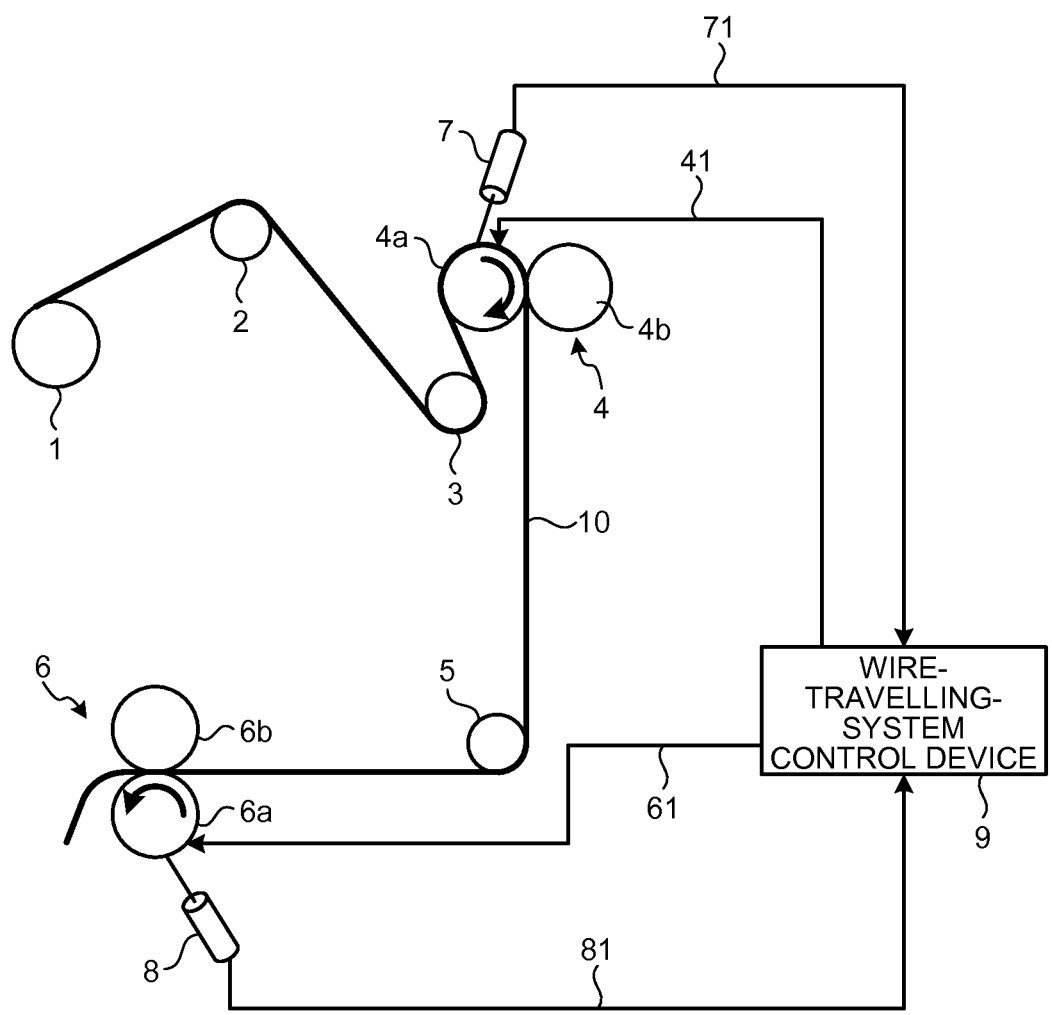
FIG. 1 depicts a configuration of a wire traveling device according to an embodiment of the present invention.

FIG. 1 depicts a configuration of a wire traveling device according to an embodiment of the present invention. The wire traveling device according to the present embodiment includes a bobbin 1, guide rollers 2, 3, and 5, a wire feed roller 4a, a feed pinch roller 4b, a wire collection roller 6a, a collection pinch roller 6b, encoders 7 and 8, and a wire-traveling-system control device 9.

The bobbin 1 has a wire wound thereon and a wire 10 is supplied from the bobbin 1. The wire feed roller 4a pinches the wire 10 with the feed pinch roller 4b to pull the wire 10 out of the bobbin 1. The wire collection roller 6a pinches the wire 10 with the collection pinch roller 6b to deliver the wire 10 into a collection box (not shown). The guide rollers 2, 3, and 5 define a traveling route of the wire 10. The encoder 7 serving as a first encoder detects the amount of rotation of the wire feed roller 4a as the number of pulses (a wire-feed-roller position feedback (FE) value 71) and outputs the detected amount as feedback information to the wire-traveling-system control device 9. The encoder 8 serving as a second encoder detects the amount of rotation of the wire collection roller 6a as the number of pulses (a wire-collection roller position feedback (FR) value 81) and outputs the detected amount as feedback information to the wire-traveling-system control device 9.

Figure 2:
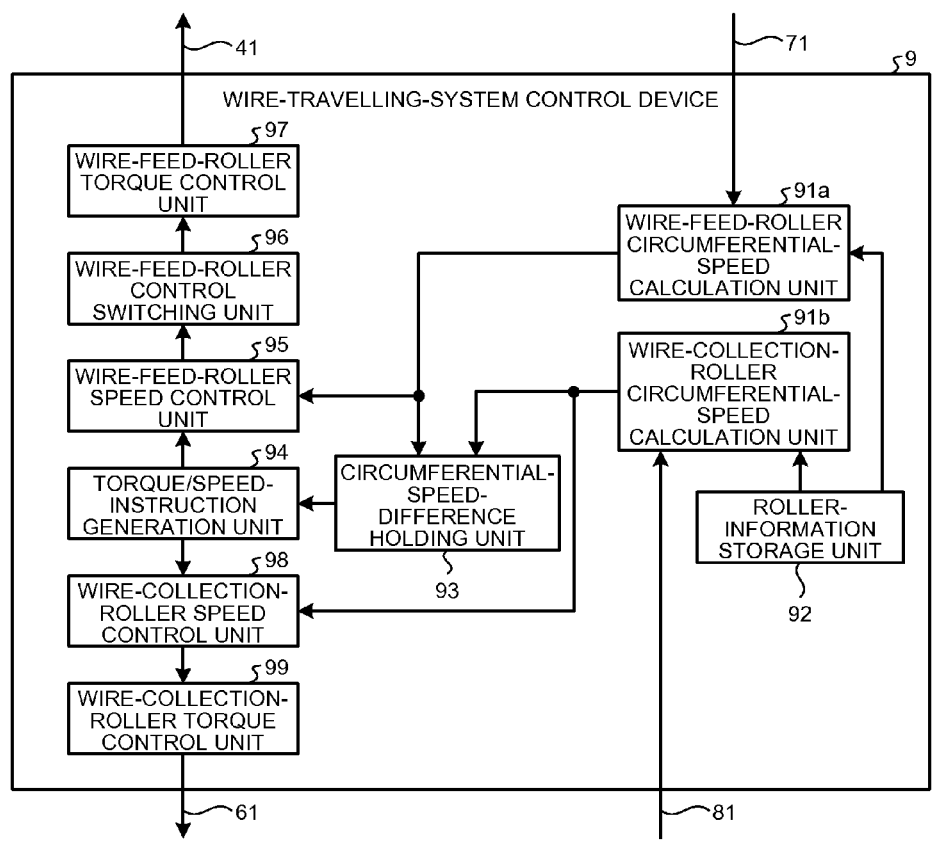
FIG. 2 depicts a configuration of a wire-traveling-system control device.

FIG. 2 depicts a configuration of the wire-traveling-system control device 9. The wire-traveling-system control device 9 includes a wire-feed-roller circumferential-speed calculation unit 91a, a wire-collection roller circumferential-speed calculation unit 91b, a roller-information storage unit 92, a circumferential-speed-difference holding unit 93, a torque/speed-instruction generation unit 94, a wire-feed-roller speed control unit 95, a wire-feed-roller control switching unit 96, a wire-feed-roller torque control unit 97, a wire-collection roller speed control unit 98, and a wire-collection roller torque control unit 99.

The wire-feed-roller circumferential-speed calculation unit 91a calculates a rotational speed of the wire feed roller 4a based on information of the wire feed roller 4a, stored in the roller-information storage unit 92, and the amount of change per unit time in the amount of rotation of the wire feed roller 4a, input as the feedback information from the encoder 7 and also calculates a circumferential speed of the wire feed roller 4a based on the calculated rotational speed of the wire feed roller 4a. Similarly, the wire-collection roller circumferential-speed calculation unit 91b calculates a rotational speed of the wire collection roller 6a based on information of the wire collection roller 6a, stored in the roller-information storage unit 92, and the amount of change per unit time in the amount of rotation of the wire collection roller 6a, input as the feedback information from the encoder 8 and also calculates a circumferential speed of the wire collection roller 6a based on the calculated rotational speed of the wire collection roller 6a. The roller-information storage unit 92 has information on the diameters or radii of the wire feed roller 4a and the wire collection roller 6a and the numbers of pulses for one revolution thereof obtained by the encoders 7 and 8, respectively, stored therein. The circumferential-speed-difference holding unit 93 calculates a circumferential speed difference based on the circumferential speeds of the wire feed roller 4a and the wire collection roller 6a input from the wire-feed-roller circumferential-speed calculation unit 91a and the wire-collection roller circumferential-speed calculation unit 91b, respectively, and holds the calculated circumferential speed difference therein.

The torque/speed-instruction generation unit 94 receives an instruction on travel, stop, acceleration, deceleration, or the like of the wire from a machining control device (not shown) and generates a torque instruction or speed instruction for the wire feed roller 4a and a speed instruction for the wire collection roller 6a. The wire-feed-roller speed control unit 95 receives the wire-feed-roller speed instruction from the torque/speed-instruction generation unit 94 and generates a wire-feed-roller torque instruction to cause a wire-feed-roller speed FB from the wire-feed-roller circumferential-speed calculation unit 91a to match to the wire-feed-roller speed instruction. The wire-feed-roller control switcher 96 receives a switch signal for a wire-feed-roller control method from the machining control device (not shown), selects the wire-feed-roller torque instruction output from the speed-instruction generation unit 94 when the switch signal indicates a speed control method or selects the wire-feed-roller torque instruction output from the wire-feed-roller speed control unit 95 when the switch signal indicates a tension control method, and outputs the selected instruction. The wire-feed-roller torque control unit 97 controls a wire-feed-roller current 41 to cause the wire feed roller to output a torque according to the instruction received from the wire-feed-roller control switcher 96.

The wire-collection roller speed control unit 98 receives the wire-collection roller speed instruction from the torque/speed-instruction generation unit 94 and generates a wire-collection roller torque instruction to cause a wire-collection roller speed FB from the wire-collection roller circumferential-speed calculation unit 91b to match to the wire-collection roller speed instruction. The wire-collection roller torque control unit 99 controls a wire-collection roller current 61 to cause the wire collection roller to output a torque according to the instruction received from the wire-collection roller speed control unit 98.

The wire-traveling-system control device 9 receives an instruction on travel, stop, acceleration, deceleration, or the like of the wire input from the machining control device (not shown) that controls a machining operation in the wire electric discharge machine by execution of an numerical control (NC) program or by a user's operation and changes the traveling speed of the wire 10 according to the input instruction.

Tachometers can be used instead of the encoders 7 and 8 to detect the rotational speeds and the detected rotational speeds can be input to the wire-traveling-system control device 9 (the wire-feed-roller circumferential-speed calculation unit 91a and the wire-collection roller circumferential-speed calculation unit 91b).

The wire traveling device according to the present embodiment changes the speeds of the wire feed roller and the wire collection roller to keep the circumferential speed difference therebetween immediately before changing, when the wire traveling speed is to be accelerated or decelerated during traveling of the wire 10. Specifically, when acceleration or deceleration is practically performed, the wire-feed-roller speed instruction is generated based on the detected circumferential speed difference between the wire feed roller 4a and the wire collection roller 6a and the current wire-collection roller speed instruction value. This is continued until the acceleration/deceleration process is completed, so that a stable rotational speed difference before the acceleration/deceleration process is performed is always kept. This control is explained below with reference to a flowchart.

Figure 3:
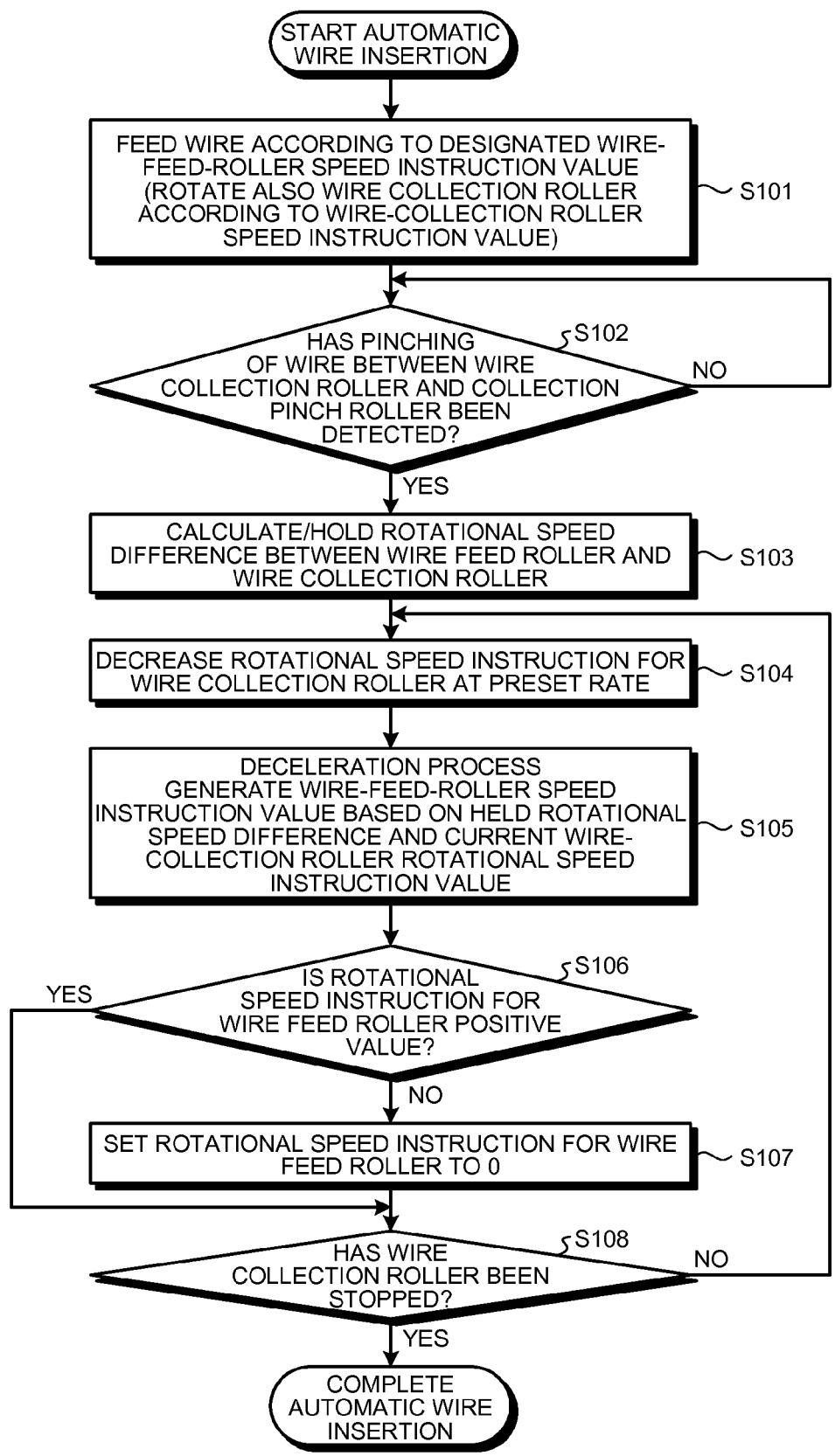
FIG. 3 is a flowchart of an operation of the wire traveling device at the time of wire automatic insertion.

FIG. 3 is a flowchart of an operation of the wire traveling device at the time of wire automatic insertion. The wire feed roller 4a and the wire collection roller 6a are first rotated in a state where the wire 10 pulled out of the bobbin 1 is pinched between the wire feed roller 4a and the feed pinch roller 4b (Step S101). When pinching of the wire 10 between the wire collection roller 6a and the collection pinch roller 6b is detected and a stop instruction for the wire 10 is input from a machining control device (not shown) (YES at Step S102), the circumferential-speed-difference holding unit 93 calculates a difference between the circumferential speed of the wire feed roller 4a, calculated by the wire-feed-roller circumferential-speed calculation unit 91a, and the circumferential speed of the wire collection roller 6a, calculated by the wire-collection roller circumferential-speed calculation unit 91b and holds the calculated value therein (Step S103). When the wire collection roller 6a and the collection pinch roller 6b are not pinching the wire 10 and a stop instruction for the wire 10 is not input by the machining control device (not shown) (NO at Step S102), the wire feed roller 4a is continuously rotated to feed the wire 10 and the wire collection roller 6a is rotated.

The torque/speed-instruction generation unit 94 generates a wire-collection roller speed instruction value that decreases at a preset rate (Step S104) and further generates a wire-feed-roller speed instruction value to cause a difference from the wire-collection roller speed instruction value to be the value calculated at Step S103 (Step S105). When the wire-feed-roller speed instruction is a negative value (NO at Step S106), the rotational speed instruction for the wire feed roller is set to 0 (zero) (Step S107).

The rotational speeds of the wire feed roller 4a and the wire collection roller 6a change according to the wire-feed-roller speed instruction value and the wire-collection roller speed instruction value, respectively, output from the wire-traveling-system control device 9. When the rotational speeds of the wire feed roller 4a and the wire collection roller 6a become zero and the circumferential speeds of the wire feed roller 4a and the wire collection roller 6a calculated by the torque/speed-instruction generation unit 94 become zero (the rollers 4a and 6a have been stopped) (YES at Step S108), the process ends. When the wire feed roller 4a and the wire collection roller 6a have not been stopped yet (NO at Step S108), the process returns to Step S104 so that the torque/speed-instruction generation unit 94 generates a wire-feed-roller speed instruction value and a wire-collection roller speed instruction value to be output to the wire feed roller 4a and the wire collection roller 6a, thereby changing the rotational speeds, respectively.

In the automatic wire connection operation, the deceleration process is performed to stop the wire feed roller 4a and the wire collection roller 6a after the wire collection roller 6a and the collection pinch roller 6b pinch the wire 10. At that time, deceleration is performed with a circumferential speed difference immediately therebefore being kept, so that the circumferential speed difference can be kept during the deceleration process and that breaking of the wire 10 can be prevented. It is also possible to prevent the wire 10 from sagging which is caused because the circumferential speed of the wire feed roller 4a becomes higher than that of the wire collection roller 6a during the deceleration process.

Figure 4:
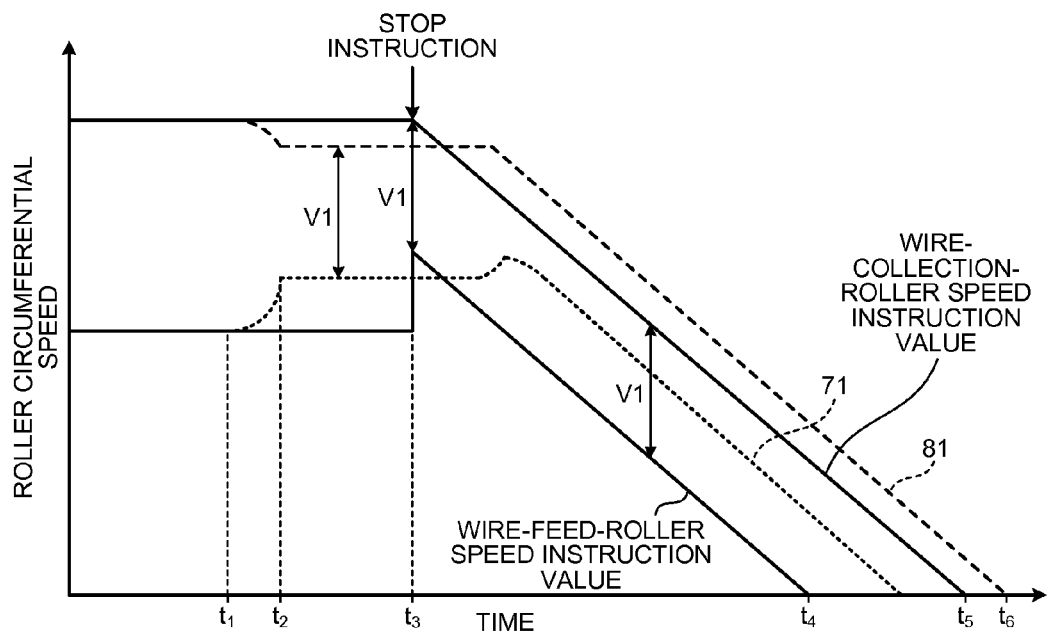
FIG. 4 is an example of a relation of circumferential speeds of a wire feed roller and a wire collection roller and speed instruction values therefor at the time of automatic wire connection.

FIG. 4 is an example of a relation of the circumferential speeds of the wire feed roller and the wire collection roller and the speed instruction values therefor at the time of automatic wire connection. In FIG. 4, the speed instruction values are converted into circumferential speeds corresponding to rotational speeds and are shown. The wire 10 fed by the wire feed roller 4a is pinched by the wire collection roller 6a and the collection pinch roller 6b at a time t1. This increases the circumferential speed of the wire feed roller 4a while decreasing the circumferential speed of the wire collection roller 6a, resulting in steady states, respectively, at a time t2. A circumferential speed difference at that time is V1.

At a time t3, a stop command is input from a machining control device (not shown) to the traveling-system control device 9. At that time, the wire-feed-roller speed instruction value generated by the torque/speed-instruction generation unit 94 is a value that is V1 lower than the wire-collection roller speed instruction value.

From the time t3 to a time t4, the torque/speed-instruction generation unit 94 generates the wire-feed-roller speed instruction value to cause a difference from the wire-collection roller speed instruction value to be V1.

At the time t4, the wire-feed-roller speed instruction value becomes zero. Although a value obtained by subtracting the circumferential speed difference V1 from the wire-collection roller speed instruction value is a negative value from that time, the torque/speed-instruction generation unit 94 generates the wire-feed-roller speed instruction value to have a value of zero.

The wire-collection roller speed instruction value becomes zero at a time t5 and the rotational speed of the wire collection roller 6a becomes zero at a time t6, whereby the automatic connection operation for the wire 10 is completed.

Figure 5:
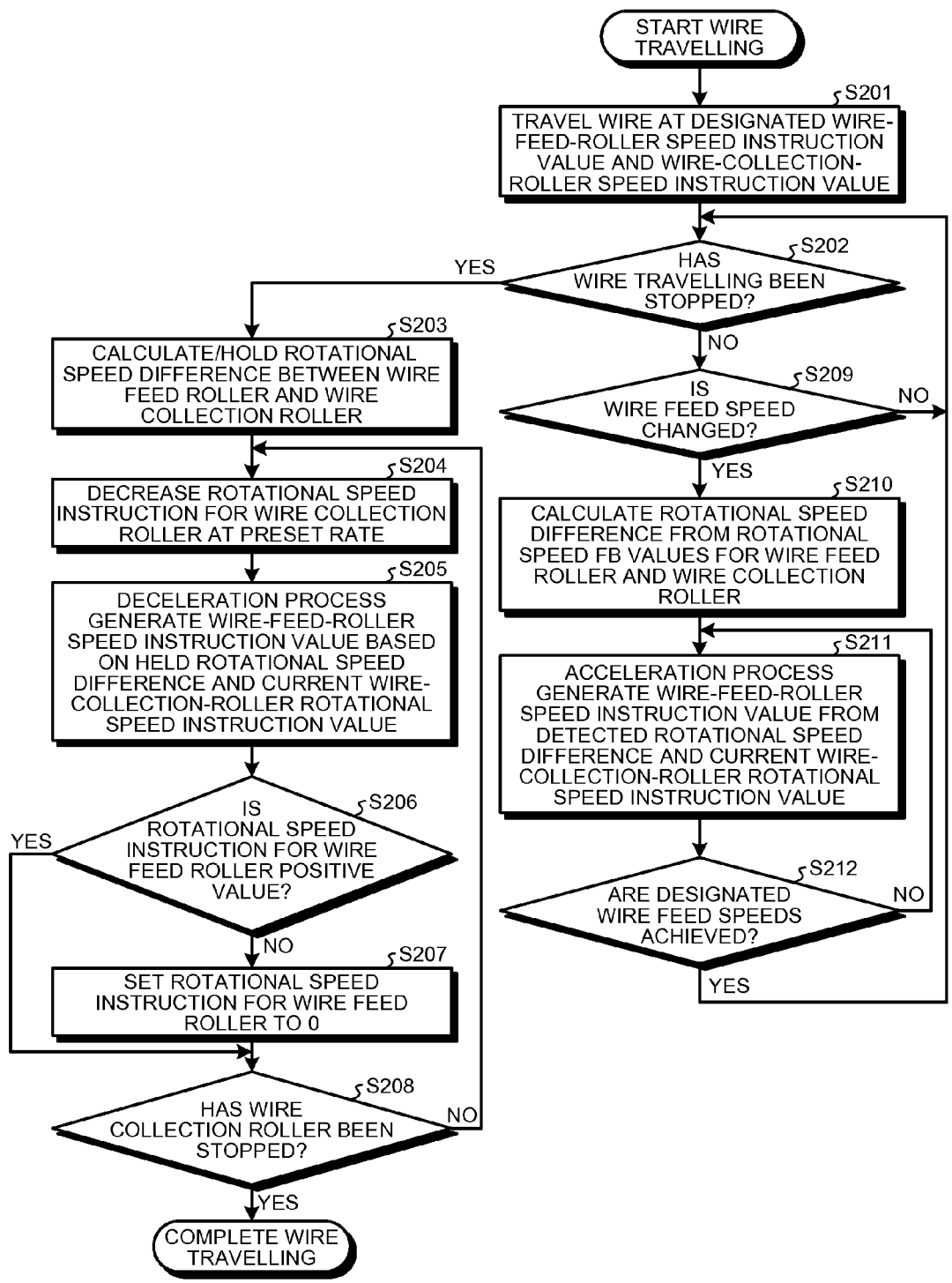
FIG. 5 is a flowchart of an operation of the wire traveling device during normal wire traveling.

FIG. 5 is a flowchart of an operation of the wire traveling device during normal wire traveling. The wire feed roller 4a and the wire collection roller 6a are rotated at designated speed instruction values to travel the wire 10 (Step S201). At that time, the rotational speed of the wire feed roller 4a is controlled in such a manner that the torque of the wire feed roller 4a becomes constant to cause the tension of the wire 10 to have a predetermined value. When the wire-traveling-system control device 9 receives a stop instruction from a machining control device (not shown) (YES at Step S202), processes at Steps S203 to S208 which are the same as those at Step S103 to S108 in FIG. 3 are performed.

When the wire-traveling control device 9 receives not a stop instruction (NO at Step S202) but a wire-feed-speed change instruction (YES at Step S209) from the machining control device (not shown), the circumferential-speed-difference holding unit 93, as at Step S103, calculates a difference between the circumferential speed of the wire feed roller 4a and the circumferential speed of the wire collection roller 6a and holds the calculated difference therein (Step S210).

The torque/speed-instruction generation unit 94 generates a wire-collection roller speed instruction value and further generates a wire-feed-roller speed instruction value to cause a difference from the wire-collection roller speed instruction value to be the value calculated at Step S207. The torque/speed-instruction generation unit 94 outputs the generated wire-feed-roller speed instruction value and wire-collection roller speed instruction value to the speed control units 95 and 98 for the wire feed roller 4a and the wire collection roller 6a, respectively (Step S211).

The rotational speeds of the wire feed roller 4a and the wire collection roller 6a change according to the wire-feed-roller speed instruction value and the wire-collection roller speed instruction value input from the wire-traveling-system control device 9, respectively. When the wire-feed-roller speed instruction value and the wire-collection roller speed instruction value have predetermined values, respectively (YES at Step S212), the process returns to Step S202 to change the control method of the wire feed roller 4a to the tension control. When the wire-feed-roller speed instruction value and the wire-collection roller speed instruction value do not have the predetermined values, respectively (NO at Step S212), the process returns to Step S211, so that the torque/speed-instruction generation unit 94 generates a wire-feed-roller speed instruction value according to the speed control and outputs the wire-feed-roller speed instruction value and the wire-collection roller speed instruction value to the wire feed roller 4a and the wire collection roller 6a to change the rotational speeds, respectively.

Also during the normal wire traveling as well as during the automatic wire connection operation, it is possible to prevent wire breaking due to pulling of the wire 10 at a higher level of tension or prevent the wire 10 from sagging because the circumferential speed of the wire feed roller 4a becomes higher than that of the wire collection roller 6a.

Figure 6:
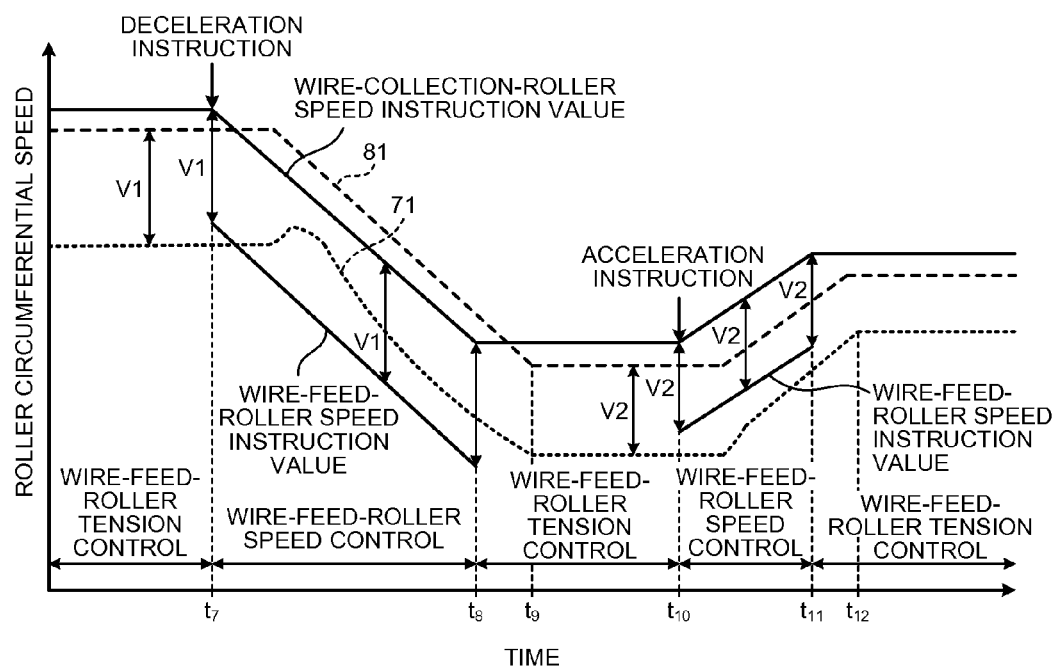
FIG. 6 is an example of a relation of circumferential speeds of a wire feed roller and a wire collection roller and speed instruction values therefor during wire traveling.

FIG. 6 is an example of a relation of the circumferential speeds of the wire feed roller and the wire collection roller and the speed instruction values therefor during wire traveling. In FIG. 6, the speed instruction values are converted into circumferential speeds corresponding to rotational speeds and are shown. The wire-feed-roller speed instruction value in a case where the control method of the wire feed roller 4a is the tension control is not shown in FIG. 6. Before a time t7, the wire feed roller 4a is subject to the tension control and the wire 10 travels stably. The circumferential speed difference at that time is V1.

At the time t7, a deceleration command is input from a machining control device (not shown) to the wire-traveling-system control device 9. The wire-traveling-system control device 9 switches the control method of the wire feed roller 4a from the tension control to the speed control in response to the deceleration command. At that time, the wire-feed-roller speed instruction value generated by the torque/speed-instruction generation unit 94 is a value that is V1 lower than the wire-collection roller speed instruction value.

From the time t7 to a time t8, the torque/speed-instruction generation unit 94 generates the wire-feed-roller speed instruction value to cause a difference from the wire-collection roller speed instruction value to be V1 and outputs the wire-feed-roller speed instruction value and the wire-collection roller speed instruction value to the wire feed roller 4a and the wire collection roller 6a, respectively.

At the time t8, the wire-feed-roller speed instruction value reaches a designated post-deceleration speed. The wire-traveling-system control device 9 changes the control method of the wire feed roller 4a to the tension control. The wire feed roller 4a is subject to the tension control from that time. At a time t9, change in the circumferential speeds of the wire feed roller 4a and the wire collection roller 6a stops and the wire 10 travels stably. The circumferential speed difference at that time is V2.

At a time t10, an acceleration command is input from the machining control device (not shown) to the wire-traveling-system control device 9. The wire-traveling-system control device 9 switches the control method of the wire feed roller 4a from the tension control to the speed control in response to the acceleration command. At that time, the wire-feed-roller speed instruction value generated by the torque/speed-instruction generation unit 94 is a value that is V2 lower than the wire-recover-roller speed instruction value.

From the time t10 to a time t11, the torque/speed-instruction generation unit 94 generates the wire-feed-roller speed instruction value to cause a difference from the wire-collection roller speed instruction value to be V2 and outputs the wire-feed-roller speed instruction value and the wire-collection roller speed instruction value to the speed control units for the wire feed roller 4a and the wire collection roller 6a, respectively.

At the time t11, the wire-feed-roller speed instruction value reaches a designated post-acceleration speed. The wire-traveling-system control device 9 switches the control method of the wire feed roller 4a to the tension control. The wire feed roller 4a is subject to the tension control from that time. At a time t12, change in the circumferential speeds of the wire feed roller 4a and the wire collection roller 6a stops and the wire 10 travels stably.

According to the present embodiment, variations of the difference in the circumferential speeds of the wire feed roller 4a and the wire collection roller 6a can be suppressed and thus breaking or sagging of the wire 10 can be prevented. This is particularly effective to speed-up the automatic wire connection when a fine wire is used as the wire 10. Also during the normal wire traveling after completion of the wire connection, breaking or sagging of the wire 10 can be prevented when the traveling speed is to be changed. Effects mentioned above can be obtained regardless of the diameter or the material of the wire 10, and any operation of adjusting parameters or the like is not required.

While a case where the wire-feed-roller speed instruction value is generated based on the wire-collection roller speed instruction value has been described as an example in the above explanations, the wire-collection roller speed instruction value can be generated based on the wire-feed-roller speed instruction value to keep the circumferential speed difference.

While a case where the wire-traveling-system control device 9 changes the traveling speed of the wire according to an instruction from a machining control device (not shown) has been described in the above example, it is also possible to detect pinching of the wire 10 by the wire collection roller 6a and the collection pinch roller 6b based on change in the circumferential speed or the like and to perform a traveling stop operation for the wire 10 automatically during the automatic wire connection.

INDUSTRIAL APPLICABILITY

As described above, the wire traveling device according to the present invention is useful in a case of using a fine wire with a size of less than 00.1 millimeter, and is particularly suitable for automatic connection of a fine wire.

REFERENCE SIGNS LIST 1 bobbin
2, 3, 5 guide roller
4a wire feed roller
4b feed pinch roller
6a wire collection roller
6b collection pinch roller
7, 8 encoder
9 wire-traveling-system control device
10 wire
41 wire-feed-roller current
61 wire-collection roller current
71 wire-feed-roller position FB value
81 wire-collection roller position FB value
91a wire-feed-roller circumferential-speed calculation unit
91b wire-collection roller circumferential-speed calculation unit
92 roller-information storage unit
93 circumferential-speed-difference holding unit
94 torque/speed-instruction generation unit
95 wire-feed-roller speed control unit
96 wire-feed-roller control switcher
97 wire-feed-roller torque control unit
98 wire-collection roller speed control unit
99 wire-collection roller torque control unit

The invention claimed is:

1. A wire travelling device that travels a stretched wire between a wire feed roller and a wire collection roller, the wire travelling device comprising:
   a speed-instruction generation unit that, in changing a traveling speed of the wire, generates a speed instruction value for one of the wire feed roller and the wire collection roller, then generates a speed instruction value for the other roller so that a difference with respect to the other roller of the two rollers is a circumferential speed difference between a circumferential speed of the wire feed roller and a circumferential speed of the wire collection roller, and outputs each of the generated speed instruction values to the wire feed roller and the wire collection roller;

a circumferential-speed calculation unit that calculates each circumferential speed of the wire feed roller and the wire collection roller based on feedback information from the wire feed roller and the wire collection roller; and a circumferential-speed-difference holding unit that calculates and holds the circumferential speed difference during a time from when the changing of the traveling speed of the wire is started until the changing thereof is completed, wherein the speed-instruction generation unit generates a speed instruction value for one of the wire feed roller and the wire collection roller so that the difference with respect to the other roller of the two rollers is the circumferential speed difference held in the circumferential-speed difference holding unit immediately before the changing of the traveling speed of the wire is started.

2. A wire electrical discharge machine comprising the wire travelling device according to claim 1.

3. A wire travelling device according to claim 1, wherein, in response to determining that the wire feed roller speed instruction is a negative value, the rotational speed instruction for the wire feed roller is set to zero.

4. A wire travelling device according to claim 1, wherein, the calculated circumferential speed difference is kept as a constant speed difference between the wire feed roller and the wire collection roller until the wire feed roller speed instruction value becomes zero.

5. A wire travelling device according to claim 1, wherein the circumferential speed of the wire collection roller is higher than the circumferential speed of the wire feed roller.

6. The wire travelling device according to claim 1, further comprising:

a roller-information storage unit that has information stored therein on diameters of the wire feed roller and the wire collection roller;

a first encoder that measures an amount of rotation of the wire feed roller as the feedback information from the wire feed roller; and a second encoder that measures an amount of rotation of the wire collection roller as the feedback information from the wire collection roller, wherein the circumferential-speed calculation unit calculates the circumferential speed of the wire feed roller, based on the information on the diameter of the wire feed roller stored in the roller-information storage unit and the amount of rotation input from the first encoder, and calculates the circumferential speed of the wire collection roller, based on the information on the diameter of the wire collection roller stored in the roller-information storage unit and the amount of rotation input from the second encoder.

7. A wire electrical discharge machine comprising the wire travelling device according to claim 2.

8. A wire travelling device according to claim 1, further comprising a machining control device that controls a machining operation in the wire electric discharge machine by execution of an numerical control program or by a user's operation.

9. The wire travelling device according to claim 8, wherein the circumferential-speed-difference holding unit calculates the circumferential speed difference in response to detecting pinching of the wire between the wire collection roller and a collection pinch roller, and a stop instruction for the wire is input from the machining control device.

10. The wire travelling device according to claim 9, wherein the stop instruction for the wire is input after reaching a steady state of the wire by increasing the circumferential speed of the wire feed roller while decreasing the circumferential speed of the wire collection roller.

* * * * *